Patented May 26, 1936

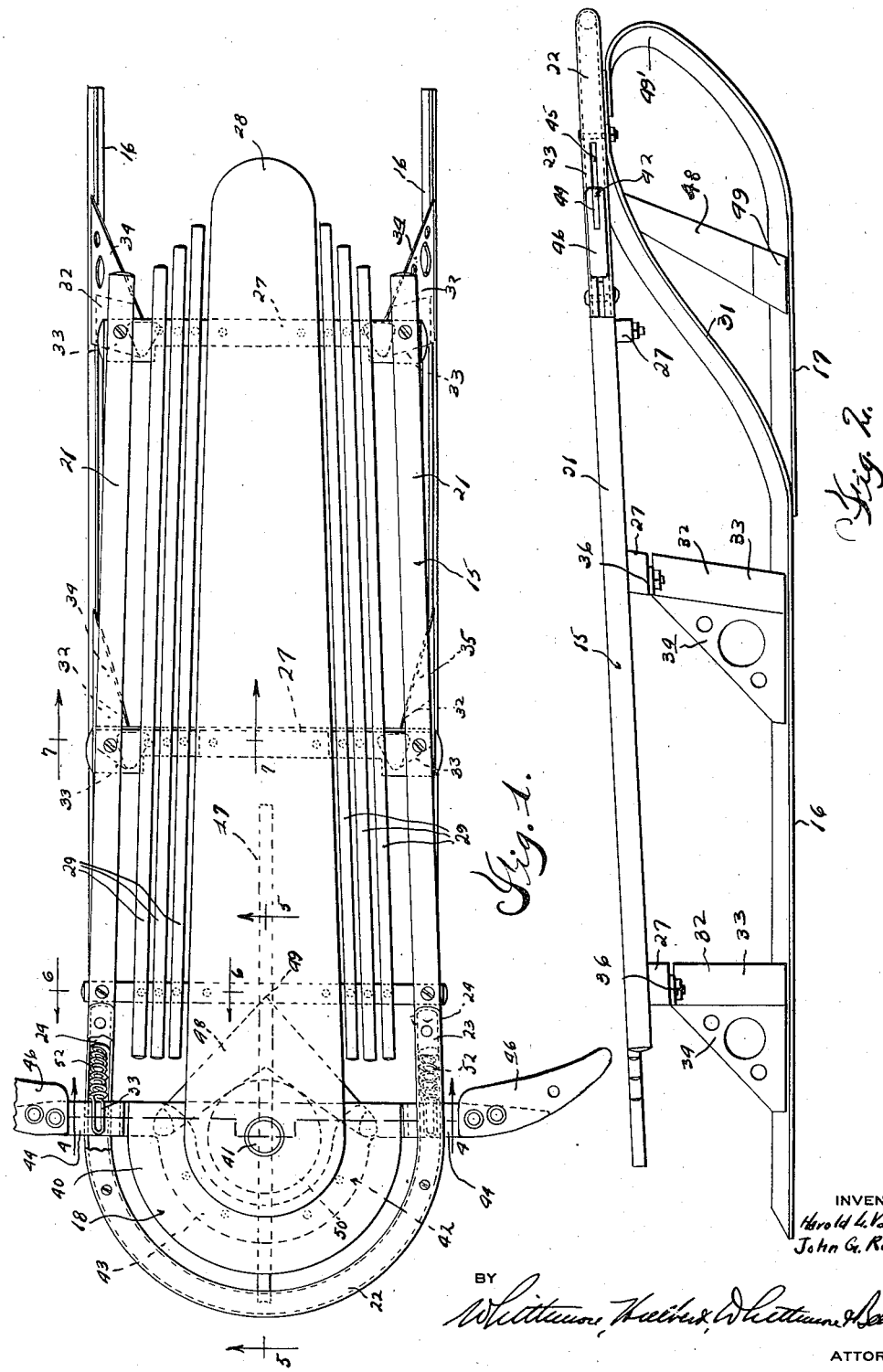

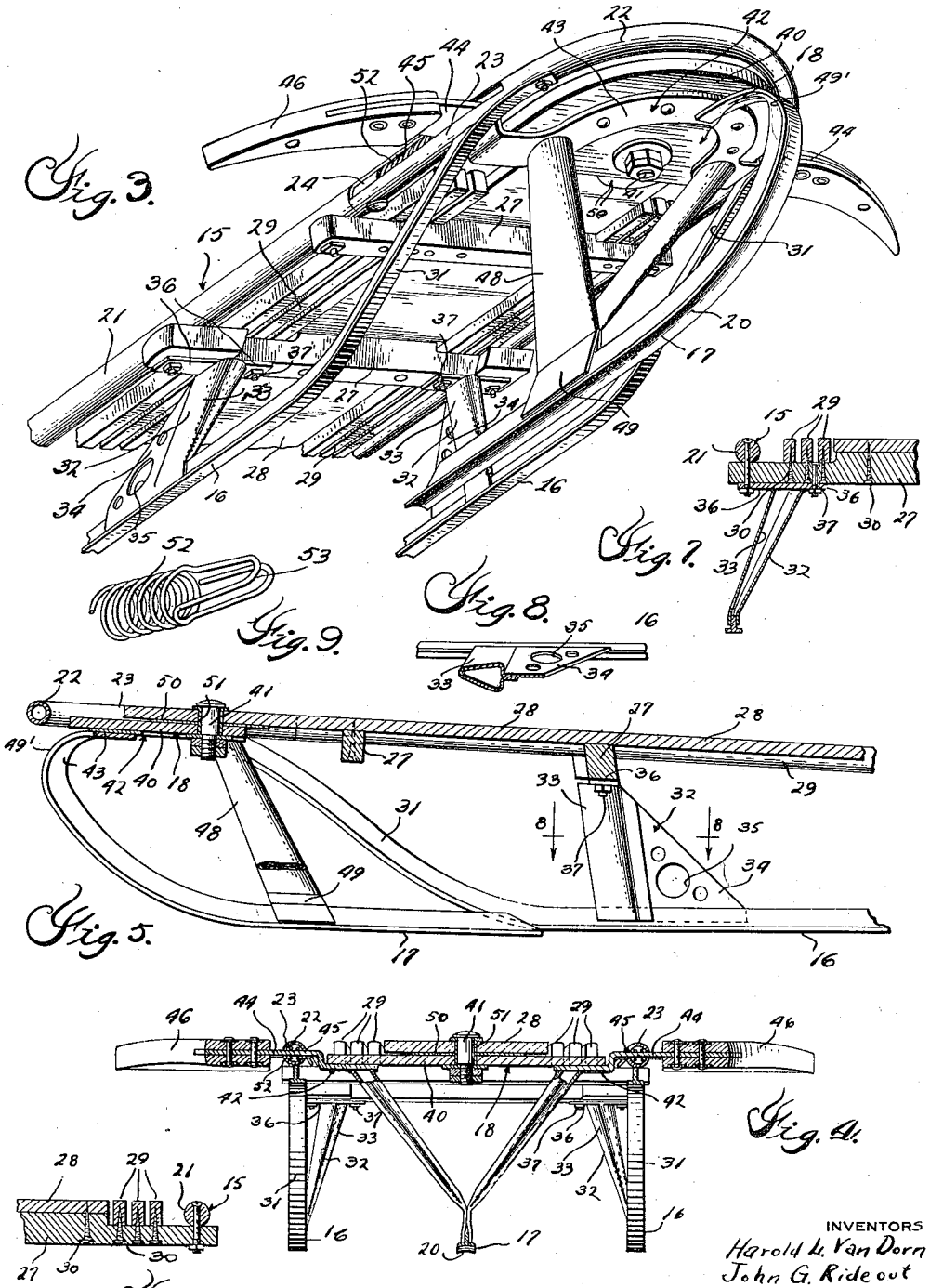

2,041,982

UNITED STATES PATENT OFFICE 2,041,982

SLED

Harold L. van Doren and John G. Rideout, Toledo, Ohio, assignors to The American-National Company, Toledo, Ohio, a corporation of Ohio Application January 29, 1934, Serial No. 708,917

28 Claims. (Cl. 280—21)

This invention relates generally to sleds and refers more particularly to coasting sleds.

One of the principal objects of this invention resides in the provision of a sled construction composed of a relatively few simple parts so designed and connected together as to provide a light, inexpensive and durable sled construction.

Another feature of this invention is attributed to the efficient steering mechanism provided and also to the relatively simple manner in which the steering mechanism may be operated. In accordance with this invention, steering of the sled is effected without sacrificing rigidity by an auxiliary runner interposed substantially midway between the usual side runners, and the effectiveness of this arrangement is appreciably enhanced by semi-flexibly connecting the intermediate runner to the framing in such a manner that the surface-engaging face of this runner assumes a position slightly below the corresponding faces of the side runners when the sled is unloaded. The flexibility of the connection is such that when a normal load is placed on the sled the surface-engaging face of the latter runner assumes a position in a common plane with the corresponding faces of the side runners; or in other words, the intermediate runner is placed under tension so as to correspondingly increase the frictional engagement of the latter with the surface and thereby improve the steering effect thereof. The flexing feature aforesaid prevails only when the surface upon which the sled is used is of a non-resilient nature such as hard ice since relatively soft snow will give sufficiently to permit all three runners to engage the surface. Irrespective of whether the engagement of all the runners with the surface is effected by flexing the steering gear or by compressing the snow beneath the steering runner, the frictional resistance between this runner and surface will be greater than the resistance between the side runners and surface.

A further object of this invention which contributes materially to securing a durable sled construction as well as one capable of being easily steered, resides in the novel steering mechanism provided, and also in the means for connecting the auxiliary steering runner to this mechanism.

A further feature of this invention resides in the provision of a sled of the type previously set forth, having a combined side frame, front bumper and housing for the means employed to maintain the intermediate steering runner in its normal position substantially parallel to the side runners.

In addition to the foregoing, this invention contemplates the provision of steering mechanism which aside from performing its intended function of swivelly supporting the auxiliary runner, also serves the purpose of a baffle to prevent the accumulation of snow on the board of the sled.

With the foregoing as well as other objects in view, the invention resides in the novel construction and arrangements of parts which will be made more apparent as this description proceeds, especially when considered in connection with the accompanying drawings wherein:

Figure 1 is a plan view, partly in section, of a sled constructed in accordance with this invention;

Figure 2 is a side elevational view of the sled shown in Figure 1;

Figure 3 is a fragmentary prespective view of the sled shown in Figure 1;

Figure 4 is a cross-sectional view taken substantially on the plane indicated by line 4—4 of Figure 1;

Figure 5 is a longitudinal sectional view taken substantially on the plane indicated by the line 5—5 of Figure 1;

Figure 6 is a sectional view taken substantially on the line 6—6 of Figure 1;

Figure 7 is a similar sectional view taken on the line 7—7 of Figure 1;

Figure 8 is a perspective view of a section taken on the line 8—8 of Figure 5; and Figure 9 is a detail view of one of the springs employed for maintaining the steering runner in substantially parallel relationship to the side runners.

In general, the sled shown herein for the purpose of illustration comprises the frame 15, side runners 16 carried by the frame and a steering runner 17 supported midway between the side runners by a rockable plate designated generally herein by the reference character 18. The steering runner 17 is supported from the plate 18 in such a manner that the surface-engaging face not only extends below the corresponding faces of the runners 16 but engages the surface in advance of the runners 16.

The connection between the steering runner and fifth wheel unit is such that when a predetermined load is supported upon the sled the flexibility will be sufficient to permit all three runners to engage the surface providing the latter is of a non-resilient nature, such as hard ice. The arrangement is such that the steefing runner will, in effect, be under tension when the sled is in use; or in other words, a greater pressure will be exerted on the surface by the face of the steering runner than the pressure exerted by the side runners 16. Increasing the frictional resistance of the steering runner in the manner pointed out above correspondingly increases the effectiveness of this runner to steer the sled and, in order to further enhance this operation, the face of the steering runner may be hollow ground as indicated in Figure 3 by the reference character 20. It is to be understood at this point that if the surface upon which the sled is to be used is of relatively soft snow, the latter under the steering runner will be compressed to such an extent as to permit all three runners to engage the surface, and since the snow under the steering runner will be compressed to a greater extent than the snow under the side runners, the desired increase in friction of the steering runner will result.

Referring now more in detail to the sled construction, it will be noted that the frame 15 is provided with sills 21 that are connected together at their forward ends by means of a U-shaped tubular bumper bar 22. The leg portions 23 of the bar 22 receive and are rigidly secured to suitable reduced portions 24 at the forward ends of the sills. The side sills 15 are connected together at longitudinally spaced points by means of suitable transverse cross members 27 having their extremities rigidly secured to the undersides of the sills in the manner clearly shown in Figure 3. The cross members 27, in addition to establishing a tie between the side sills 15, also serve as a support for the central board 28 of the sled and for the rails 29 disposed upon opposite sides of the central board. The board 28 and rails 29 are supported by the cross members 27 within the confines of the frame 15 and are secured to the aforesaid cross members by suitable screws 30 in the manner clearly shown in Figure 7.

The side runners 16 of the sled are preferably T-shaped in cross section with the contacting surfaces either flat or semi-round and the forward ends 31 thereof incline upwardly for attachment to the bumper rail 22, as shown in Figure 3. The surface engaging portions of the rails are rigidly supported from the frame 15 through the medium of suitable struts 32 permanently fixed at the lower ends thereof to the stem portions of the T-shaped rails, having the upper ends bolted or otherwise suitably secured to the cross braces 27 of the frame. Although various different designs of struts may be employed for accomplishing the purpose previously set forth, nevertheless the particular type illustrated is preferred since the latter are not only relatively light in weight but are constructed to afford maximum rigidity. As shown in the drawings, the struts 32 are formed of sheet metal, having hollow post-like portions 33 and having webs 34 projecting rearwardly from the portions 33. The portions 33 of the struts are stream-lined to provide minimum air resistance and the webs 34 are preferably apertured as at 35 to reduce the weight of the struts without affecting the rigidity of the same. The lower edges of the struts may be welded to the stem portions of the runners 16, if desired, and the upper ends of the portions 33 may be provided with lateral flanges 36 for engagement with the undersides of the cross members 27. As shown in Figure 7, the inwardly extending flanges of the struts are secured to the cross members 27 by the bolts 37, while the outwardly extending flanges on the struts may be secured to the cross members by the same bolts provided for attaching the side sills of the frame to the cross members.

The steering mechanism comprises a disk or plate 40 supported below the forward end of the board 28 for rocking movement about an up and down axis afforded by the pivot 41 carried by the board. Although the plate 40 is positioned on the underside of the board 28 it is, nevertheless, located within the confines of the frame 15 and, in the present instance, extends beyond the forward edge of the board so as to prevent the accumulation of snow on the front end of the latter. In order to effect a rocking movement of the plate about the axis of the pivot 41 we provide a steering arm 42 having a central portion 43 rigidly secured to the underside of the plate and having lateral projections 44 at opposite ends thereof offset upwardly with reference to the central portion 43. The projections 44 are located in a common plane and are extended through elongated slots 45 formed in opposite side walls of the leg portions 23 of the bumper bar 22. The extremities of the projections 44 have secured thereto suitable grips 46 of such construction as to permit the same to be either engaged by the feet or grasped by the hands of the operator.

With the construction as thus far described it will be seen that the plate 40 may be rocked about the axis of the pin by manipulation of the steering arm and in order to transmit this motion to the auxiliary runner 17 we provide a V-shaped strut 48 having the apex 49 embracing opposite sides of the web of the runner 17 intermediate the ends of the latter as clearly shown in Figure 5. The upper ends of the strut are fixedly secured to the central portion 43 of the arm 42 slightly in advance of the apex and the forward end of the steering runner is curved rearwardly as at 49' for attachment to the central portion 43 aforesaid of the arm 42. The points of attachment of the strut and runner to the steering arm are concentrically arranged with respect to the pivot 41 so as to insure relatively easy steering of the runner 17 from the arm 42. It should further be noted that binding and undue friction of the relatively movable parts is prevented by the bearing plate 50 interposed between the disk 40 and board 28 and also by the metallic sleeve 51 for the pin 41. In addition to designing the connection between the strut 48 and arm 42 to provide easy steering of the runner 17, care is taken to provide sufficient inherent resiliency in this connection to insure the degree of flexing of the steering gear necessary to permit both the side runners to engage the surface when the sled is loaded. Of course the pressure exerted on the surface by the runner 17 will exceed the pressure exerted on the same surface by the side runners but this is desirable since it materially increases the steering efficiency, especially in the present instance wherein the contacting surface of the center runner is hollow ground and the corresponding surfaces of the side runners are either flat or semi-round. Attention may also be called to the fact at this point that the construction is such that the tendency of steering the sled to the left is to throw the left front end downwardly providing a banking angle in the proper direction.

In order to normally hold the steering runner in parallel relation to the side runners we provide a spring 52 within each of the legs 23 of the bumper bar 22 between the projections 44 on the steering arm and the reduced forward ends 24 of the side sills 21. The rear ends of the springs merely abut the ends of reduced portions 24 and the forward ends of the springs are bifurcated as at 53 for receiving the projections 44 between the furcations thereof. The two springs are preferably of equal strength so as to exert the same force on the arm 42 at opposite sides of the pin 41.

Thus from the foregoing it will be seen that we have provided a sled composed of a relatively few simple parts capable of being readily assembled and cooperating in assembled relation to form a light but extremely durable construction. It will also be apparent that we have provided steering mechanism of such design as to insure easy and effective steering of the sled without interfering with the main or side runners. In addition it is to be noted that the center or steering runner is provided with a hollow ground face to enable it to more effectively govern the direction of the sled and the side runners are provided with semi-round or flat faces in order to more readily follow the center runner.

What we claim as our invention is:

1. A sled having a frame provided with a U-shaped bumper bar having leg portions substantially tubular in cross section, side sills having portions at their forward ends secured within said leg portions, and cross bars interconnecting said side sills intermediate the ends thereof.

2. A sled having a frame provided with a U-shaped bumper bar at the forward end thereof, side sills having portions at the forward end thereof rigidly secured to the legs of said bar, and cross braces interconnecting the side sills intermediate the ends thereof.

3. A sled having a frame provided with a U-shaped bumper bar having leg portions substantially tubular in cross section, side sills having reduced portions at the forward ends thereof secured within the leg portions of said bar, cross members interconnecting said sills intermediate the ends thereof, and a platform supported on the cross members substantially in the plane of the side sills.

4. A sled having a frame provided with side portions having elongated slots in the sides thereof, runners at opposite sides of the frame, a steering runner intermediate the side runners, a member extending transversely of the frame through the elongated slots aforesaid and supported intermediate its ends from the frame for rocking movement about an up and down axis, and means connecting the steering runner to said member.

5. A sled having a frame provided with tubular side portions having elongated slots in opposite sides thereof, runners at opposite sides of the frame, a steering runner intermediate the side runners, a member extending transversely of the frame through the elongated slots aforesaid and supported intermediate its ends from the frame for rocking movement about an up and down axis, means connecting the steering runner to said member, and means for normally maintaining said steering runner in parallel relation to the side runners including springs housed within the tubular side portions of the frame and acting upon said member.

6. A sled having a frame provided with a U-shaped bumper bar having leg portions substantially tubular in cross section, side sills having portions at the forward ends secured within said leg portions, runners supported by the frame on opposite sides thereof, a steering runner intermediate the side runners, a member extending transversely of the frame and having portions extending through elongated slots in said leg portions, means supporting said member from the frame for rocking movement about an up and down axis, means connecting the steering runner to said member, and means normally holding said steering runner in parallel relation to the side runners including springs housed within the tubular leg portions between the forward ends of the side sills and portions of the member passing through the slots.

7. A sled having a frame including laterally spaced side sills, a rearwardly opening substantially U-shaped bumper bar terminally connected to the forward ends of said sills and provided adjacent said ends with longitudinally extending slots, side runners beneath and secured to said frame, a steering runner swivelly connected to said frame adjacent the forward ends of said side runners, and steering arm for said steering runner extending through the slots aforesaid in said bumper bar.

8. A sled having a frame including laterally spaced side sills, a rearwardly opening substantially U-shaped bumper bar in advance of and terminally connected to said sills at their forward ends, the arms of the U being tubular and having longitudinally extending slots therein, side runners beneath and rigid with said frame, a vertical pivot carried by said frame, a plate-like member supported below said frame for movement on said pivot, a steering runner supported from said plate-like member, and a steering arm for said steering runner rigid with said plate-like member and having portions extending through the slots in the arms of the bumper aforesaid and projecting laterally beyond the same so as to be accessible for steering purposes, and yieldable means within said tubular arms normally holding said steering arm at right angles to the longitudinal median line of the sled.

9. A sled having a frame including laterally spaced side sills, a rearwardly opening substantially U-shaped bumper bar in advance of and terminally connected to said sills at their forward ends, the leg portions of said bumper bar being tubular in formation and having transversely aligned elongated slots therein, side runners beneath and secured to said frame, a steering runner beneath said frame intermediate the side runners, a connection between said steering runner and frame permitting movement of the steering runner relative to said frame, a steering arm for said steering runner extending through the slots aforesaid in the leg portions of the bumper bar, and means normally holding the steering arm in a predetermined position including yieldable elements within the leg portions of said bumper bar between the side sills and said steering arm.

10. A sled having a frame including laterally spaced side sills, a rearwardly opening substantially U-shaped bumper bar in advance of and terminally connected to said sills, cross-bars connected to said sills at spaced points longitudinally thereof, a central board rigid with said cross bars between said sills and terminating short of the foremost portion of the bumper bar, side runners beneath said frame, struts between said side runners and cross bars, a steering runner beneath said frame intermediate said side runners, a plate-like member swivelly connected to said central board at the forward end thereof, a steering arm for said steering runner rigid with said plate-like member and having portions slidably engaging and projecting laterally beyond portions of the U-shaped bumper bar, a portion of said steering runner being connected to said steering arm in advance of the swivel connection aforesaid, and a substantially V-shaped strut having the apex of the V connected to the steering runner and having the furcations of the V connected to the steering arm at substantially diametrically opposite points of the swivel connection aforesaid.

11. A sled having a rigid frame provided with sills, a rearwardly opening substantially U-shaped bumper bar terminally connected to said sills, the leg portions of said bar having slots therein, runners beneath and rigid with said frame, a steering runner beneath said frame intermediate the runners aforesaid, a vertical pivot carried by said frame, a plate-like member supported for rocking movement on said pivot, means connecting the steering runner to said plate-like member, means for rocking said member about said pivot including a steering arm rigid with said member and having portions extending through the slots in said bumper bar and accessible for steering purposes upon the outer sides of said bumper bar, and means normally holding said steering arm in a predetermined position relative to said frame including yieldable means within the leg portions of said bumper bar engaging the arm portions aforesaid in said slots.

12. A sled having a frame including laterally spaced side sills, tubes projecting forwardly from said sills and having longitudinally extending slots therein, a steering runner, and means for steering said runner including a steering bar extending through the slots in said tubes.

13. A sled having a frame including laterally spaced side sills, tubes projecting forwardly from said sills and having longitudinally extending slots therein, a steering runner suspended from said frame, means for steering said runner including a steering bar extending through the slots in said tubes, and yieldable means within the tubes normally holding the steering bar in a predetermined position relative to said frame.

14. A sled having a frame, side runners beneath said frame having upright webs, and connections between said runners and frame including sheet metal struts having post-like portions and substantially flat webs, said post-like portions straddling and secured to the webs of the runners and having lateral flanges secured to said frame, and said upright webs projecting rearwardly from said post-like portions beside and secured to the webs of said runners.

15. A sled having a frame including laterally spaced side sills, cross bars connected to said sills at spaced points longitudinally thereof, a central board rigid with said cross bars between said sills, side runners beneath said frame, struts between said side runners and cross bars, a steering runner beneath said frame intermediate said side runners, a plate-like member swivelly connected to said central board at the forward end thereof, a steering arm for said steering runner rigid with said plate-like member, a portion of said steering runner being connected to said steering arm in advance of the swivel connection aforesaid, and a substantially V-shaped strut having the apex of the V connected to the steering runner and having the furcations of the V connected to the steering arm at substantially diametrically opposite points of the swivel connection aforesaid.

16. A sled having a frame including laterally spaced side sills, cross bars connected to said sills at spaced points longitudinally thereof, a central board rigid with said cross bars between said sills, a bumper bar substantially U-shaped in plan projecting forwardly from and terminally secured to said sills, a pivot carried by said central board at its forward end, a plate-like member mounted on said pivot, side runners beneath and supporting said frame, a steering runner beneath said frame intermediate said side runners and connected to said plate-like member, a steering arm rigid with said plate-like member adjacent said pivot, said plate-like member having a portion substantially conforming in plan to the U-shaped bumper bar and substantially closing the space enclosed by said bumper bar in advance of said steering arm and forming a shield tending to prevent snow from passing upwardly onto said center board.

17. A sled having a frame, side runners supporting said frame, a steering runner intermediate the side runners, a bumper bar carried by and projecting forwardly from the frame, said bumper bar cooperating with the frame to enclose a space above the steering runner, a steering arm for the runner, and means associated with the steering arm for substantially closing the space enclosed by the bumper bar to prevent snow from passing upwardly onto the frame.

18. A sled having a frame, side runners supporting said frame, a steering runner between said side runners, a rearwardly opening substantially U-shaped bumper bar projecting forwardly from said frame, a steering arm for the steering runner crossing the frame at the rear end of said U-shaped bumper bar, and a segmental shield substantially filling the space bounded by the U-shaped bumper bar and said steering arm for preventing snow from passing upwardly in said space over said arm onto said frame.

19. A sled having a frame provided with side portions having elongated slots in opposite sides thereof, runners connected to the frame at opposite sides thereof, a steering runner connected to the frame intermediate the side runners, and actuating means for the steering runner including means extending through the elongated slots aforesaid.

20. A sled having a frame provided with side portions having elongated slots in opposite sides thereof, runners connected to the frame at opposite sides thereof, a steering runner connected to the frame intermediate the side runners, and actuating means for the steering runner including a member connected intermediate its ends to said steering runner and having opposite end portions thereof extending through the elongated slots aforesaid.

21. A sled having a frame including side bars, a rearwardly opening substantially U-shaped bumper bar for said frame having the arms of the U in advance of and projecting endwise from the forward ends of said side bars, runners connected to the frame at opposite sides thereof in rear of said bumper bar, a steering runner between said side runners, a steering arm connected intermediate its ends to said steering runner and having opposite end portions thereof extending transversely of said side bars, and a connection between the steering arm and frame including a segmental plate substantially filling the space bounded by the U-shaped bumper bar and steering arm so that snow and the like will be effectively prevented from passing upwardly in said space over said steering arm.

22. A sled provided at opposite sides thereof with longitudinally extending portions having elongated slots in opposite sides thereof, supporting runners, one of said runners being a steering runner, and steering mechanism for said steering runner including a steering arm extending through the elongated slots aforesaid.

23. A sled having a steering runner, a steering arm for said runner, tubular portions having slots receiving the steering arm, and yieldable means within said tubular portions engaging said arm for holding the steering runner in a predetermined position relative to the other runners.

24. A sled having a steering runner, steering mechanism for the runner, and a bumper for the sled at the forward end thereof, a part of said bumper forming a housing for a portion of said steering mechanism.

25. A sled having a frame, runners connected to said frame at opposite sides thereof, a rearwardly opening substantially U-shaped bumper bar at the forward end of said frame projecting forwardly in advance of said side runners, and steering mechanism for said sled entirely beneath said frame at the rear end of said U-shaped bumper bar and including a steering arm extending transversely of said frame and having end portions projecting laterally outwardly beyond opposite sides of said frame at points in rear of the forward ends of said side runners.

26. A sled having an elongated frame, a rearwardly opening substantially U-shaped bumper bar projecting forwardly from the forward end of the frame, and steering mechanism for said sled including a segmental plate-like member pivotally connected to said frame at the forward end thereof and substantially filling the space within the U-shaped bumper bar, whereby snow beneath the frame will effectively be prevented from flying upwardly through said space onto said frame.

27. A sled having an elongated frame, a rearwardly opening substantially U-shaped bumper bar projecting forwardly from the forward end of said frame, and steering mechanism for said sled including a segmental plate-like member substantially filling the space within the U-shaped bumper, a pivot element connecting the plate-like member to said frame, a steering arm rigid with said plate-like member and extending transversely of the arms of the U-shaped bumper bar, a depending strut provided at its upper end with laterally spaced portions that are rigid with said steering arm at opposite sides of the pivot element, and a steering runner rigid with the lower end of the strut and provided at its forward end with an upwardly and rearwardly curved portion that is rigid with the steering arm in advance of said pivot element.

28. A sled having an elongated frame provided with side bars, a rearwardly opening substantially U-shaped bumper bar projecting forwardly from the forward end of the frame, the arms of the U being in alignment with and projecting endwise from the forward ends of said side bars, said arms having slots therein, and steering mechanism for said sled wholly in rear of the curved portion of the U-shaped bumper bar and including a steering arm extending through the slots in said bumper arms.

HAROLD L. van DOREN.
JOHN G. RIDEOUT.